Aug. 25, 1936.　　W. O. WINSTON ET AL　　2,051,977
SOD CUTTING MACHINE
Filed Aug. 27, 1935　　4 Sheets-Sheet 1
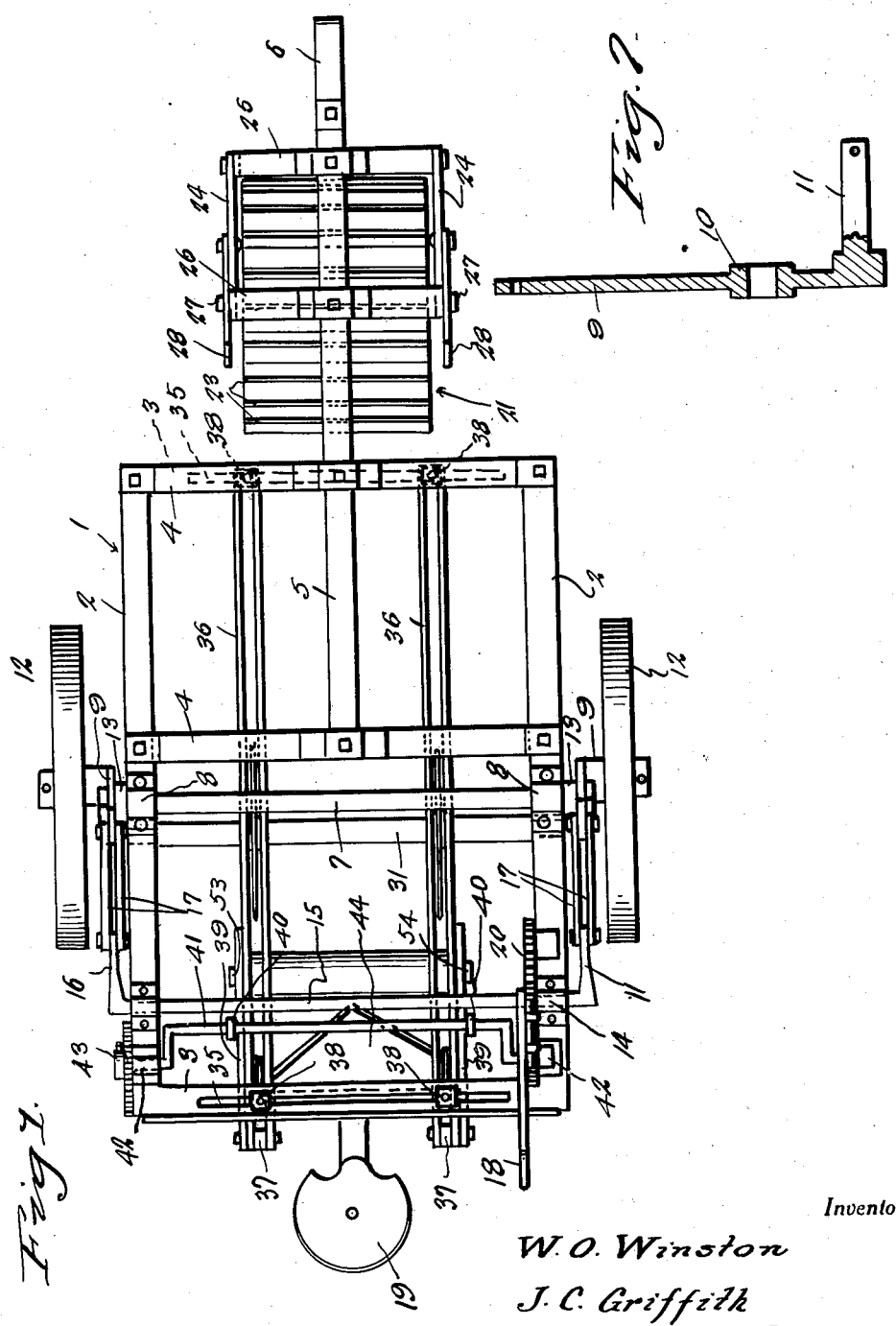
Inventor
W. O. Winston
J. C. Griffith
By Clarence A. O'Brien
Attorney Aug. 25, 1936.  W. O. WINSTON ET AL  2,051,977
SOD CUTTING MACHINE
Filed Aug. 27, 1935  4 Sheets-Sheet 2
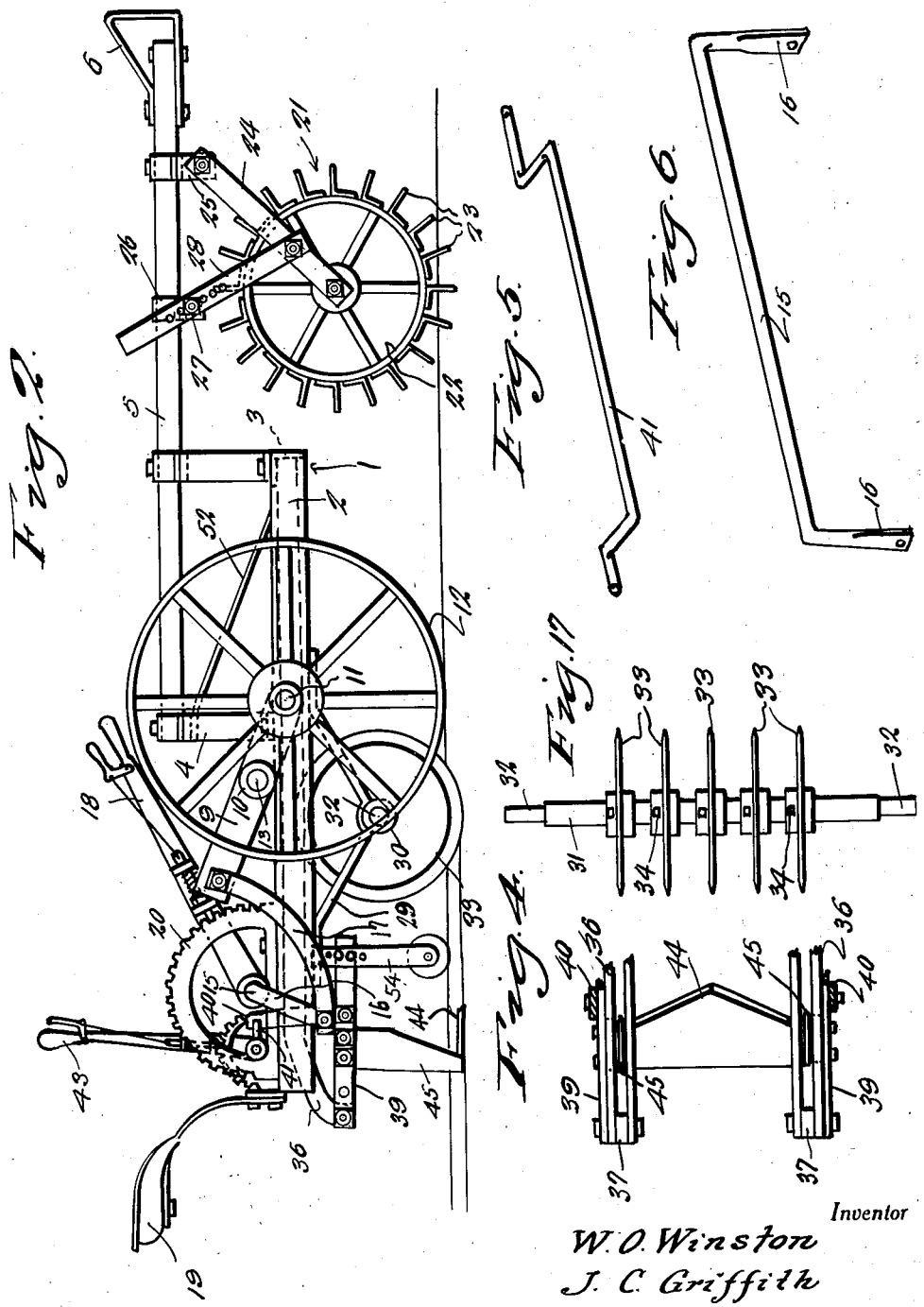
Inventor
W. O. Winston
J. C. Griffith
By Clarence A. O'Brien
Attorney

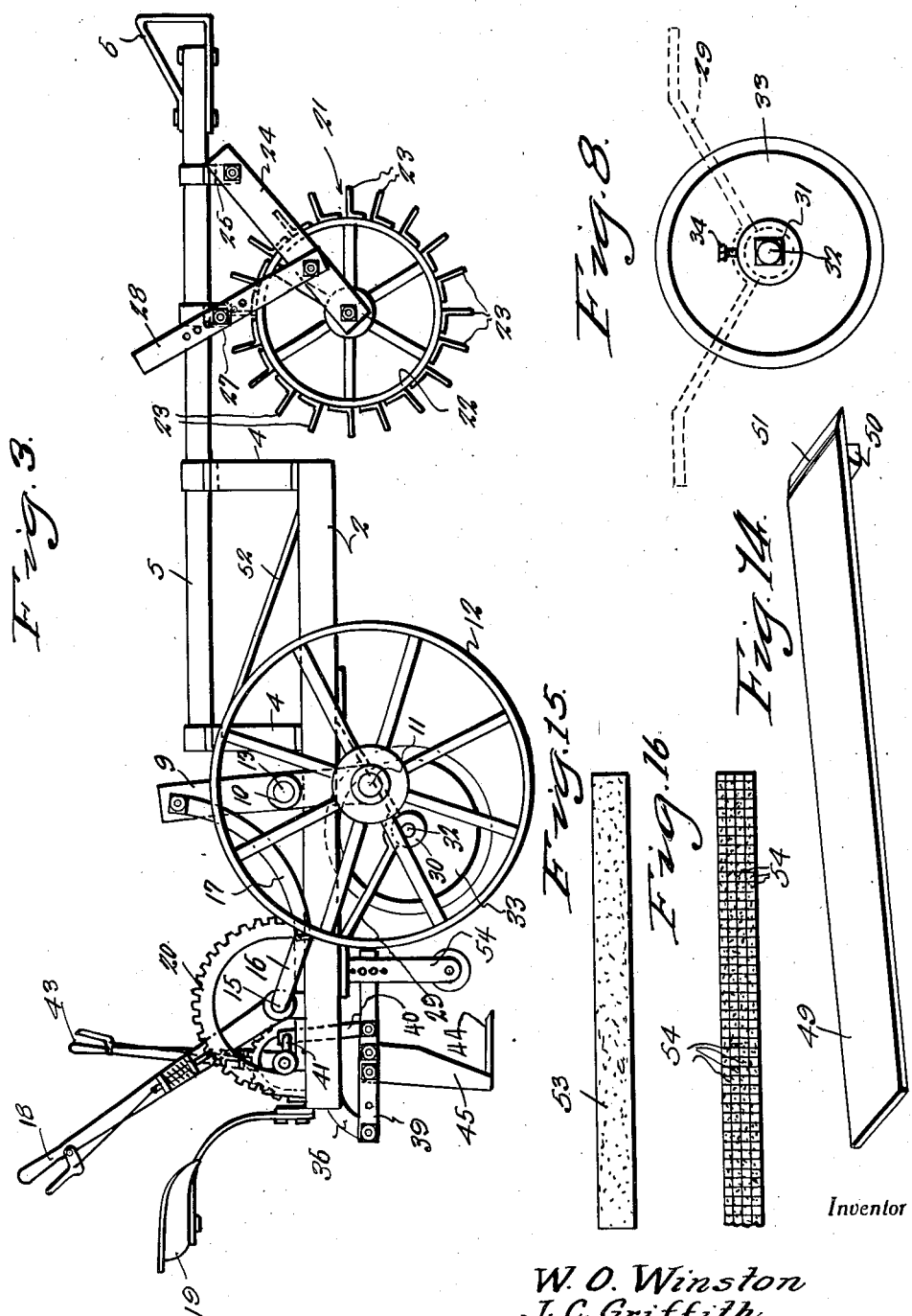

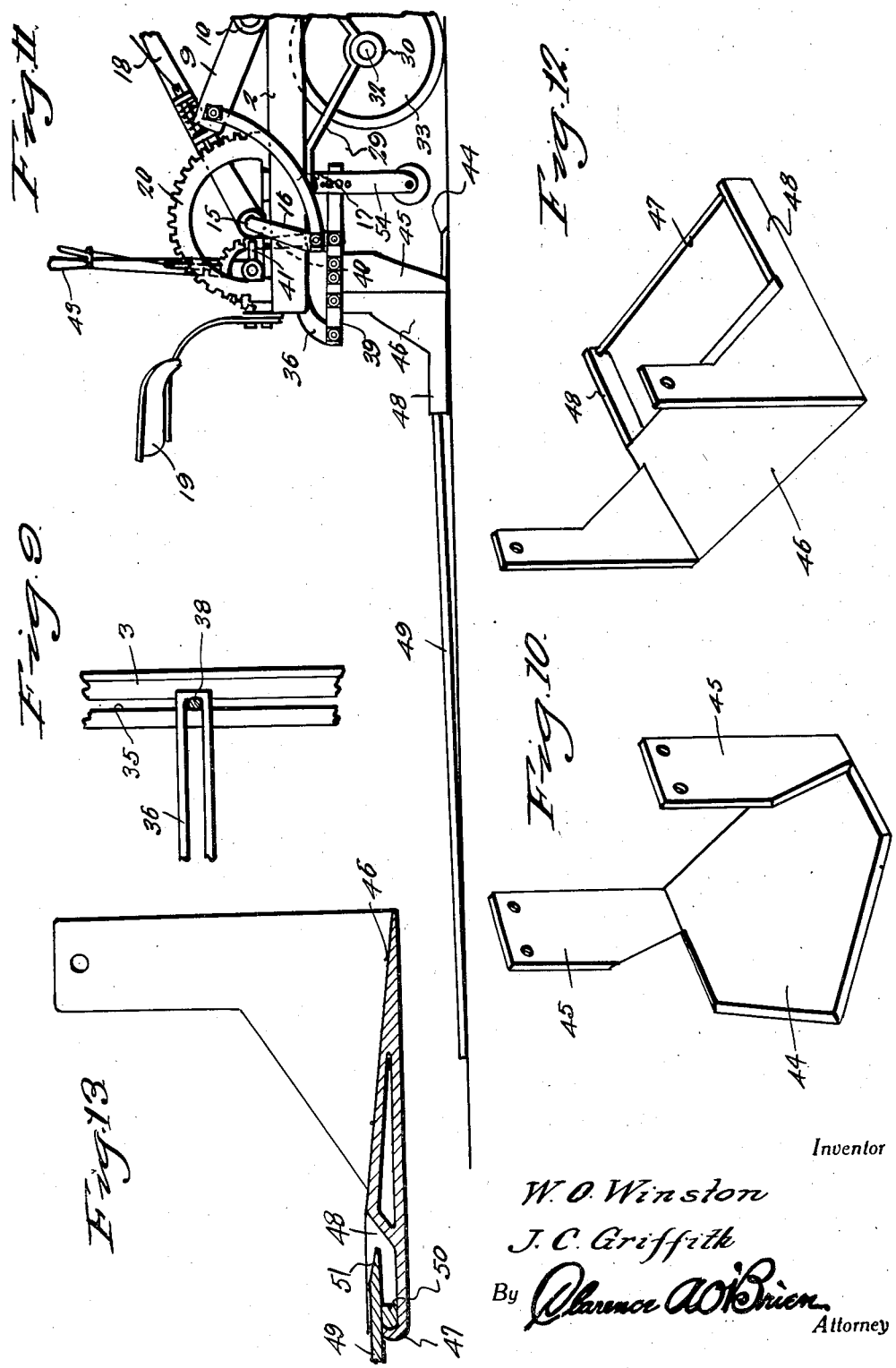

Patented Aug. 25, 1936

2,051,977

UNITED STATES PATENT OFFICE 2,051,977

SOD CUTTING MACHINE

William O. Winston and John C. Griffith, Many, La.

Application August 27, 1935, Serial No. 38,111

6 Claims. (Cl. 97—226)

This invention relates to new and useful improvements in sod cutting machines and has for one of its important objects to provide, in a manner as hereinafter set forth, a machine of this character which is capable of cutting the sod into strips or blocks, as desired, and then cut or sever the strips or blocks from the ground.

Another very important object of the invention is to provide a machine of the character described which includes means through the medium of which handling of the sod after it has been cut will be materially facilitated.

Still another important object of the invention is to provide a sod cutting machine which may be conveniently adjusted or regulated as desired.

Other objects of the invention are to provide a sod cutting machine which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a top plan view of a sod cutting machine constructed in accordance with the present invention.

Figure 2 is a view in side elevation of the machine, showing the cutting elements in lowered or operative position.

Figure 3 is a side elevational view of the invention, showing the cutters in raised or inoperative position.

Figure 4 is a top plan view of the severing knife with the adjacent portions of the supports therefor, the operating links being shown in horizontal section.

Figure 5 is a detail view in perspective of the crank shaft which adjusts the severing knife.

Figure 6 is a detail view in perspective of the shaft through the medium of which the frame is raised and lowered on the supporting wheels.

Figure 7 is a detail view principally in vertical section through one of the wheel supports.

Figure 8 is a detail view in side elevation of the longitudinal cutter assembly.

Figure 9 is a fragmentary view in bottom plan, showing the means for securing the laterally adjustable bars to the frame.

Figure 10 is a detail view in perspective of the severing knife.

Figure 11 is a view in side elevation of the rear portion of the machine with the handling or loading apparatus attached thereto.

Figure 12 is a detail view in perspective of the scoop or chute.

Figure 13 is a view in vertical longitudinal section through the scoop, showing the forward end portion of the loading panel connected thereto.

Figure 14 is a detail view in perspective of the loading panel.

Figure 15 is a plan view of a strip of sod which has been cut.

Figure 16 is a plan view of a plurality of sods which have been cut into blocks or squares.

Figure 17 is a plan view of the longitudinal or strip cutting assembly.

Referring now to the drawings in detail, it will be seen that the embodiment of the invention which has been illustrated comprises a frame which is designated generally by the reference numeral 1, said frame being preferably of angle iron and including side members 2 and end members 3.

Mounted transversely on the forward portion of the frame 1 are substantially V-shaped bars 4 which support a forwardly projecting tongue 5 in elevated position on said frame 1. At its forward end, the tongue 5 has mounted thereon a clevis 6 or any other means for connecting the machine to a tractor or other source of power.

Mounted transversely at an intermediate point on the frame 1 is a shaft 7 which extends beyond the side members 2, said shaft 7 being mounted in bearings 8 on said side members. The reference numeral 9 designates metallic arms which are journaled, at an intermediate point, on the end portions of the shaft 7, said arms being provided with bearings 10, (see Figure 7) for the reception of said shaft. Spindles 11 project outwardly from the lower end portions of the arms 9 and journaled on said spindles are supporting wheels 12. Suitable spacers 13 may be provided between the arms 9 and the bearings 8. Any suitable means may be provided for retaining the arms 9 on the end portions of the shaft 7. Journaled in bearings 14 on the rear portion of the frame 1 is a transversely extending rocker shaft 15 which is provided, at its ends, with arms 16. Arcuate links 17 operatively connect the arms 16 to the upper end portions of the wheel supporting arms 9. Fixed on the shaft 15 is a hand lever 18 within convenient reach of an operator mounted on the seat 19, said seat 19 being mounted on the rear end of the frame 1. As is thought to be obvious, the frame 1 may be adjusted vertically by actuating the lever 18. Any suitable means, as at 20, may be provided for releasably securing the lever 18 in adjusted position.

Adjustably and removably mounted on the tongue 5 forwardly of the frame 1 is a transverse cutter unit which is designated generally by the reference numeral 21. The transverse cutter unit 21 includes a wide wheel 22 having mounted transversely thereon a plurality of spaced blades 23. The wheel 22 is journaled between a pair of arms 24 which are pivotally mounted for swinging adjustment in a vertical plane on the downturned end portions of a bar 25 which is mounted transversely beneath the tongue 5. A similar bar 26 is mounted transversely beneath the tongue 5 rearwardly of the bar 25 and adjustably secured, as at 27, to the downturned end portions thereof are braces 28 which are pivotally connected to intermediate portions of the arms 24. It will thus be seen that the wheel 22 may be conveniently raised or lowered or, if desired, removed from the machine.

Mounted beneath the side members 2 of the frame 1 is a pair of brackets 29 which carry bearings 30. The reference numeral 31 (see Figure 17) designates a polygonal shaft having circular, reduced end portions 32 journaled in the bearings 30. Adjustably and removably mounted on the shaft 31 is a gang or plurality of longitudinal or strip cutting knives 33 which, it will be observed, are in the form of disks. The knives 33 may be secured in position on the shaft 31 by set screws 34.

The end bars 3 of the frame 1 have formed therein slots 35. Extending between the end bars 3 of the frame 1 is a pair of longitudinal bars 36. Each bar 36 is formed from a metallic strip bent upon itself in a manner to define a slot, as illustrated to advantage in Figure 1 of the drawings, spacers 37 being provided between the end portions thereof. The bars 36 are mounted for lateral adjustment beneath the end bars 3 of the frame 1 through the medium of nut-equipped bolts 38 which pass through the slots 35.

Referring now to Figures 2 and 3 of the drawings, it will be seen that the bars 36 terminate in downturned rear end portions on which forwardly projecting arms 39 are pivotally mounted. Links 40 operatively connect the arms 39 to a crank shaft 41 which is journaled in suitable bearings 42 which are provided therefor on the frame members 2. A hand lever 43 is provided for actuating the crank shaft 41. Rigidly mounted on the arms 39 is a horizontal severing knife 44, said knife 44 including uprights 45 on its ends which are secured to the inner sides of the arms 39. By actuating the lever 43 the severing knife 44 may be raised or lowered as desired.

Also mounted on the arms 39, rearwardly of the knife 44, is a scoop 46 from the rear end of which an upturned hook 47 projects. The hook 47 is provided with upstanding side flanges 48. The hook 47 constitutes means for releasably connecting a handling or loading panel 49 to the machine, said slab 49 having mounted transversely beneath its forward end portion a cleat 50 (see Figure 13) which is engageable in the hook 47. The forward end portion of the panel 49 is beveled, as at 51. Adjustably secured to the arms 39, forwardly of the uprights 45, is a pair of hangers 53 between which a ground roller 54 is journaled.

Briefly, the operation of the machine is as follows:—

The apparatus is connected to a tractor or other source of power and drawn thereby over the ground. With all of the cutting members in operative position, as shown in Figure 2 of the drawings, the blades 23 will cut the sod transversely, the knives 33 will cut said sod longitudinally, and the knife 44 will then sever the sod from the ground. Should it be desired to cut the sod into strips, instead of blocks or squares, the unit 21 may be raised to inoperative position, as seen in Figure 3 of the drawings, or removed entirely from the machine. After the strips of sod have been severed from the ground by the knife 44, said sod travels up the scoop 46 and passes on to the panel 49. The strips are then cut transversely and the loaded panel 49 is removed and an empty one substituted therefor. Of course, the proper adjustments are made in order that the machine will operate at the desired depth. As many knives 33 as is desired may be mounted on the shaft 31 and said knives are, of course, spaced in accordance with the width of the strip or strips to be cut. The adjustability of the bars 36 on the frame 1 permits the use of various widths of knives 44. It may also be well to here state that the blades 23 must be at least equal in length to the distance between the outermost knives 33. A brace 52 is provided for the rear member 4. When the handling or loading equipment comprising the scoop 46 and the panel 49 is not desired it may, of course, be removed.

It is believed that the many advantages of a sod cutting machine constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:—

1. A sod cutting machine comprising, in combination, a wheeled frame, cutting elements mounted on the frame for cutting sod, a scoop mounted on said frame rearwardly of the cutting elements, and a panel pivotally connected, at one end, to the scoop for receiving the sod therefrom, the other end portion of said panel being adapted to drag on the ground.

2. A sod cutting machine comprising a wheeled frame, a plurality of circular knives mounted beneath said frame for cutting sod into strips, a knife mounted horizontally beneath the frame rearwardly of the first-named knives for severing the strips from the ground, a scoop mounted rearwardly of the second-named knife for receiving the severed sod therefrom, and a loading panel pivotally and detachably connected, at one end, to the scoop and trailing said scoop for receiving the sod therefrom, the other end of said panel resting and dragging on the ground.

3. A sod cutting machine comprising a wheeled frame, a plurality of disk knives rotatably mounted beneath the frame for cutting sod into strips, a pair of laterally adjustable bars mounted longitudinally on the frame, a pair of arms pivotally mounted on said bars, means for manually adjusting said arms, a horizontal knife mounted on the arms rearwardly of the first-named knives for severing the sod from the ground, a scoop mounted on the arms rearwardly of the second-named knife for receiving the sod therefrom, and a panel detachably connected to the scoop and trailing said scoop on the ground for receiving the sod therefrom.

4. A sod cutting machine comprising a wheeled frame, a plurality of cutting disks rotatably mounted beneath the frame for cutting sod into strips, a pair of laterally adjustable bars mounted longitudinally on the frame, a pair of arms pivotally mounted for swinging adjustment on said bars, means for manually adjusting the arms, and a knife mounted horizontally on the arms rearwardly of the first-named knives for severing the strips from the ground.

5. A sod cutting machine comprising a wheeled frame, cutting disks rotatably mounted on said frame, laterally adjustable bars mounted longitudinally on the frame and including downturned rear end portions, forwardly extending arms pivotally connected, at one end, to said downturned end portions of the bars, means for adjusting the arms, and a severing knife mounted on said arms.

6. A sod cutting machine comprising a frame, a sod severing knife mounted on said frame, a scoop mounted on the frame rearwardly of the knife for receiving the sod therefrom, said scoop including an upturned hook on its rear end, and a loading panel detachably and pivotally connected to the scoop for receiving the sod therefrom, said loading panel comprising a cleat on one end portion engageable in the hook, the other end of said loading panel being adapted to rest and drag on the ground.

WILLIAM O. WINSTON.
JOHN C. GRIFFITH.